Patented Nov. 27, 1945

2,389,805

UNITED STATES PATENT OFFICE 2,389,805

STABILIZING ORGANO-SILOXANES

Rob Roy McGregor, Verona, and Earl Leathen Warrick, Pittsburgh, Pa., assignors to Corning Glass Works, Corning, N. Y., a corporation of New York No Drawing. Application June 22, 1944, Serial No. 541,670

7 Claims. (Cl. 260—607)

This invention relates to organo-siloxanes, and particularly to the stabilization thereof.

This application is a continuation-in-part of our copending application Serial Number 432,530, filed February 26, 1942, and assigned to the assignee of the present invention.

Organo-siloxanes are compositions comprising essentially silicon atoms connected to each other by oxygen atoms through silicon-oxygen linkages, thus

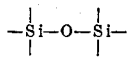

and organic radicals attached through carbon-silicon linkages to at least some of the silicon atoms. They may be prepared by the hydrolysis of a hydrolyzable organo-mono-silane followed by condensation (partial or complete) of the hydrolysis product. They may also be prepared by hydrolyzing and condensing mixtures of different hydrolyzable organo-monosilanes, as described in the copending application of James Franklin Hyde, Serial Number 432,528, filed February 26, 1942, and assigned to the assignee of the present invention. In the latter case, hydrolyzable silanes which contain no organic radicals attached to silicon through carbon-silicon linkages, such as silicon tetrachloride or ethyl orthosilicate, may be included with the organo-silanes, if desired. By employing such mixtures of silanes, it is possible to prepare organo-siloxanes which contain on the average up to and including three organic radicals per silicon atom.

By hydrolyzable organo-monosilanes, we mean derivatives of $SiH_4$, which contain hydrolyzable radicals such as halogens, amino groups, alkoxy, aroxy and acyloxy radicals, etc., and organic radicals that are joined to silicon through carbon-silicon linkage. Examples of such organic radicals are as follows: aliphatic radicals such as methyl, ethyl, propyl, isopropyl, butyl, amyl, hexyl, heptyl to octadecyl and higher; alicyclic radicals such as cyclopentyl, cyclohexyl, etc.; aryl and alkaryl radicals such as phenyl, mono- and poly-alkyl phenyls as tolyl, xylyl, mesityl, mono-, di-, and tri-ethyl phenyls, mono-, di-, and tri-propyl phenyls, etc., naphthyl, mono- and poly-alkyl naphthyls as methyl naphthyl, diethyl naphthyls, tri-propyl naphthyl, etc.; tetra-hydro-naphthyl, anthracyl, etc.; aralkyl such as benzyl, phenyl-ethyl, etc.; alkenyl such as methallyl, allyl, etc., and heterocyclic radicals. The above organic radicals may also, if desired, contain inorganic substituents such as halogens, etc.

Hydrolysis of the above silanes or mixtures thereof is generally accompanied by condensation of the intermediately formed hydroxy compounds to form siloxane linkages, thus,

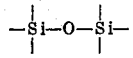

The formation of a siloxane linkage generally results from the close approach of two hydroxyl groups and subsequent elimination of water. It may also result from the close approach of one hydroxyl group to a hydrolyzable group such as halogen, acyloxy, or alkoxy, etc., and subsequent elimination of hydrogen halide, carboxylic acid or alcohol, respectively. Such eliminations are catalyzed by mineral acids, especially hydrochloric and sulphuric, and by alkali metal hydroxides, especially sodium hydroxide. As a result of the hydrolysis and concurrent condensation, organo-siloxanes are produced which are partially or completely condensed and which have on the average up to and including three organic radicals attached to each silicon atom. The organo-siloxanes, as previously mentioned, consist essentially of silicon atoms joined together by oxygen atoms through silicon-oxygen linkages and organic radicals attached to silicon through carbon-silicon linkages, the remaining valences, if any, of the silicon atoms being satisfied by hydroxyl radicals and/or by residual unhydrolyzed radicals such as halogens, alkoxy, etc., listed above as the hydrolyzable radicals.

The organo-siloxanes so obtained, some of which are liquids, others solids, differ with respect to their resistance to heat. In general, the partially condensed liquid siloxanes undergo a change in physical properties when heated, becoming more viscous, until finally they may become solids. On the other hand, those which are completely condensed, or nearly so (i. e., substantially free of hydroxyl groups) are extremely resistant to further change due to heat alone. However, even the latter may be further polymerized by contact with acidic agents, alkaline agents, or with air, as disclosed in the copending applications of James Franklin Hyde, Serial Number 481,155 filed March 30, 1943, Serial Number 481,-154, filed March 30, 1943, and Serial Number 451,354, filed July 17, 1942, all being assigned to the assignee of the present invention.

All the organo-siloxanes, both solid and liquid, undergo a gradual change in properties when exposed to the combined effect of heat and air for a prolonged period of time. This is true even of the completely condensed siloxanes. In the case of the liquid organo-siloxanes, the effect of heat and air is manifested by an increase in viscosity, frequently followed by gelation. This is objectionable where the liquid is being utilized as a hydraulic fluid, dielectric medium and the like. The resinous solid siloxanes, after long exposure to oxygen at elevated temperatures, also undergo a change in properties, becoming less flexible and tough until eventually they reach an extremely brittle stage. Such changes in properties due to heat or to heat and air combined are obviously undesirable.

The primary object of this invention is to stabilize organo-siloxanes.

Another object is to provide a method by which changes of properties of organo-siloxanes due to heat and/or oxygen can be prevented.

Another object is to provide a stabilizer for organo-siloxanes.

We have discovered that the stability of an organo-siloxane may be substantially improved by incorporating therein a minor proportion of an aromatic compound having the general formula

HO—X—N= wherein X represents a phenylene nucleus and the indicated valence bonds attached to nitrogen are satisfied by radicals of the class consisting of hydrogen, alkyls, aralkyls, aryls. alkaryls and radicals of a heterocyclic ring of which the nitrogen is a member. From 0.05 to 5%, preferably from 0.1 to 1.5% by weight of the stabilizer may be included in the composition to advantage. Although larger amounts of the stabilizer may be used, if desired, little advantage is gained thereby as will be shown below. The so-formed stabilized composition exhibits a marked improvement in resistance to change under the influence of heat and air and to small quantities of agents which tend to cause polymerization of the siloxanes.

Among the stabilizers of the class described which may be mentioned are p-amino-phenol, p-hydroxy-N-monobenzyl aniline, p-hydroxy N, N-dibenzyl aniline, 4-hydroxy-diphenyl amine, N-(4-hydroxy phenyl) morpholine, p-hydroxy-N-mono-ethyl aniline, p-hydroxy-N-dibutyl aniline, p-hydroxy-N-mono-phenyl aniline, and p-hydroxy-N-di-tolyl aniline.

In order to obtain the maximum effectiveness from the stabilizer, it is necessary to react it with the organo-siloxane in a liquid condition. This may be accomplished by heating the liquid organo-siloxane to which a small amount of stabilizer has been added, to an elevated temperature. The most effective temperature for the reaction to take place depends, as will be readily appreciated, upon the compositions, both siloxane and stabilizer, involved. However, the reaction may be effected at a lower temperature but the time required for completion is longer. In general, the solution becomes colored when the reaction is complete.

For a better understanding of the invention, reference should be had to the following examples, which are given merely by way of illustration and are not to be construed as limiting.

EXAMPLE I

Individual portions of a liquid methyl silicone (prepared by the acid catalyzed hydrolysis of dimethyldiethoxysilane) were treated by addition of 1% by weight of various stabilizers after which the different portions were heated at 230° C. The viscosities of the dimethyl silicone before and after heating for various lengths of time were determined by measuring the number of seconds required for a given amount of the liquid at room temperature to flow from an arbitrarily chosen capillary pipette. The following table shows the viscosities in seconds after heating for various lengths of time.

TABLE I

*Viscosities after heating*

|  | Hours at 230° C. | | | | | | | | | |
|---|---|---|---|---|---|---|---|---|---|---|
|  | 0 | 21 | 45 | 48 | 93 | 113 | 329 | 498 | 744 | 912 |
| p-Amino-phenol | 19 | 21.8 | 24.0 |  | 33.6 |  | 69.0 | 74.5 |  | 77.5 |
| p-Hydroxy-N-monobenzyl aniline | 19 | 21.5 | 22.9 |  | 30.8 |  | 59.4 | 74.5 |  | 74.5 |
| p-Hydroxy-N-N-dibenzyl aniline | 19 | 23.2 |  |  |  | 41.4 | 73.0 | 83.4 |  | 93.0 |
| No stabilizer | 19 | 53 |  | Solid |  |  |  |  |  |  |

It will be noted that the sample to which no stabilizer was added became solid in 48 hours, but samples containing a stabilizer remained liquid for over a month at this elevated temperature.

EXAMPLE II

Liquid dimethyl silicone was prepared by refluxing a mixture of dimethyldiethoxy silane, ethyl alcohol and aqueous hydrochloric acid as described in the above mentioned application, Serial Number 432,530. To this liquid which had a viscosity of 1,000 Saybolt seconds at 30° C. was added a small amount of p-amino-phenol. The resulting solution was heated at 230° C. The viscosity slowly rose to 6,000 Saybolt seconds after which there was no further appreciable change although heating was continued for several weeks.

EXAMPLE III

A series of copolymers of mono- and di-methyl-silicon oxides prepared by the hydrolysis of mixtures of methyltriethoxysilane and dimethyldiethoxysilane in varying molecular proportions were treated with about 1% by weight of p-aminophenol and were then heated at 230° C. until they gelled. At the same time, corresponding samples without the stabilizer were heated in the same manner. In the following table there is given the number of hours which both the stabilized and the unstabilized samples were heated before they gelled.

TABLE II

| Mol percent of monomethylsilicon oxide in copolymer | Hours heated at 230° C. to produce gelation | |
|---|---|---|
|  | Unstabilized | Stabilized |
| 2 | 14 | Over 507 |
| 5 | 11 | Over 507 |
| 10 | 26 | Over 507 |
| 15 | 28 | Over 507 |
| 20 | 17 | 387 |
| 25 | 10 | 335 |
| 30 | 5 | 239 |
| 35 | 4 | 107 |
| 38 | 1 | 59 |
| 40 | 1 | 38 |

EXAMPLE IV

The effectiveness of several organic amines of our invention upon a low viscosity dimethyl silicone was demonstrated by heating the silicone containing about 1% by weight of the amine, at 250° C. In each case, viscosity was plotted against time in hours until the smooth polymerization curve thus obtained made a sharp break upward indicating incipient gelation. In the following table are given in the column under the heading "Incipient gelation" the time in hours required to reach the point where the polymerization curve broke sharply upward. In the column under the heading "Slope" are given the values obtained by dividing the total per cent viscosity increase by the time in hours at 250° C. required to reach the point of incipient gelation. These values correspond to the average increase in viscosity per hour.

TABLE III

| Inhibitor | Incipient gelation | Slope |
|---|---|---|
| None | 5 | 55.0 |
| p-Amino-phenol | 168 | 4.5 |
| 4-hydroxy-diphenyl amine | 150 | 13.4 |
| N-(4-hydroxy-phenyl) morpholine | 8 | 51.0 |

EXAMPLE V

Liquid phenyl ethyl siloxane was prepared by the hydrolysis of the mixture of silanes obtained by the reaction of phenyl and ethyl magnesium chlorides on silicon tetrachloride. Its viscosity was 75 centistokes. Two portions of this liquid, one containing 1% by weight of p-aminophenol, were heated at 250° C. The changes in viscosity were plotted against time in hours. Immediately preceding gelation the smooth curve exhibited a sharp break upward. The slope of the curve up to the sharp break was calculated by dividing the per cent viscosity increase up to the break by the number of hours required to reach that point. In the case of the unstabilized phenyl ethyl siloxane this slope was 43.0 while in the case of the stabilized it was 19.4. The time required to reach the point of incipient gelation (i. e., the point where the polymerization curve broke sharply upward) in the case of the unstabilized phenyl ethyl siloxane was 69 hours while in the case of the stabilized it was 102 hours.

EXAMPLE VI

Liquid phenyl methyl siloxane (prepared by the hydrolysis of the mixture of silanes obtained by the reaction of phenyl and methyl magnesium chlorides on silicon tetrachloride in equimolecular proportions and having a viscosity of 3320 centistokes) was divided into two parts which were treated exactly as the liquid phenyl ethyl siloxane of Example 5. The slope calculated for the unstabilized phenyl methyl siloxane was 50.0 while for the stabilized it was 14.4. The time required to reach the stage of incipient gelation in the case of the unstabilized phenyl methyl siloxane was 39 hours while in the case of the stabilized phenyl methyl siloxane it was 102 hours.

As pointed out above and as illustrated in the examples, it is essential that the stabilizer be reacted with the liquid organo-siloxane if the maximum effect is to be obtained. In the above examples, the temperature of testing the stability was in all cases sufficiently high to insure reaction. The following table demonstrates the advisability of reaction taking place between amine and siloxane. A liquid dimethyl silicone was heated with 2% by weight of p-amino-phenol at different temperatures for different lengths of time. Any undissolved p-aminophenol was then filtered off. The viscosity changes were plotted against time in hours and the "Slopes" and times required to reach the point of incipient gelation as defined above were calculated.

TABLE IV

| Treatment time, hrs. | Temp., °C. | Incipient gelation | Slope |
|---|---|---|---|
| 15 | 125 | 8 | 41.0 |
| 30 | 125 | 8 | 52.0 |
| 60 | 125 | 8 | 22.0 |
| 60 | 145 | 8 | 50.0 |
| 120 | 145 | 8 | 12.5 |
| 15 | 200 | 52.0 | 6.2 |

It was pointed out above that the concentration of the stabilizer might be as low as .05% by weight and still be effective. In general, the effectiveness of the stabilizer appears to be directly proportional to the concentration of stabilizer which has reacted with the siloxane. Accordingly, it is clear that there is an upper limit of effective stabilizer concentration for a given siloxane. However, under certain conditions of use the siloxane may undergo a change which permits more stabilizer to react with it. In such cases, it may be desirable to have excess stabilizer present or to add more stabilizer periodically to the liquid. The latter method is preferable where the liquid is being used at sufficiently high temperature to cause sublimation or vaporization of the stabilizer. The following table shows the effect of varying the amounts in per cent by weight of p-aminophenol used to stabilize liquid dimethyl silicone. The viscosities were measured after intervals of heating at 250° C. and the per cent viscosity increase calculated.

TABLE V
*Per cent viscosity increase—250° C.*

| Conc. | ½ hr. | 6 hrs. | 10 hrs. | 28 hrs. | 68 hrs. |
|---|---|---|---|---|---|
| .0 | 12.0 | Gel | | | |
| 0.1 | 7.0 | Incipient gel | | | |
| 0.3 | 7.0 | 74 | Gel | | |
| 0.6 | 7.0 | 20 | 23 | Gel | |
| 1.0 | 7.0 | 20 | 31 | 79 | Gel |
| 1.5 | 7.0 | 13 | 28 | 79 | 435 |

We have found that the stabilizers of our invention are not only effective in stabilizing the partially dehydrated liquid organo-siloxanes but also the completely dehydrated liquid siloxanes such as the cyclics and the hexa-organo-di-siloxanes. These completely condensed siloxanes are ordinarily quite stable substances but they undergo oxidation and possibly rearrangement in the presence of oxygen at elevated temperatures, whereby the use of stabilizers becomes important. However, the use of stabilizers is particularly advantageous in the case of liquid organo-siloxanes having on the average from approximately one to approximately two monovalent organic radicals attached to each silicon atom, at least some of the radicals being alkyl radicals since these siloxanes are particularly sensitive to heat and air at elevated temperatures.

In general, organo-siloxanes treated in accordance with our invention are more resistant to change in physical properties under the influence of heat and air. Specifically the liquid organo-siloxanes are thereby rendered more resistant to increase in viscosity or polymerization due to the effects of heat, the action of oxygen and catalysts in general. Because of their low pour points, small change of viscosity with temperature and inertness to rubber, they are useful as hydraulic fluids for the transmission of pressure, also as damping media for delicate instruments and recoil mechanisms or shock absorbing devices. The resinous solid organo-siloxanes when stabilized in accordance with our invention retain their flexibility and toughness for a greater length of time, and are thereby rendered more useful as electrically insulating coatings for metallic conductors, etc.

We claim:

1. The method of stabilizing an organo-siloxane which comprises incorporating therein stabilizing amounts of a hydroxy aromatic amine selected from the class consisting of p-amino-phenol, p-hydroxy-N-monobenzyl aniline, p-hydroxy-N-N-dibenzyl aniline and 4-hydroxy-diphenyl amine, the organic substituents of said siloxane consisting essentially of monovalent hydrocarbon radicals attached to silicon through carbon-silicon linkages.

2. A composition of matter comprising an organo-siloxane and a minor proportion of a hydroxy aromatic amine selected from the class consisting of p-amino-phenol, p-hydroxy-N-monobenzyl aniline, p-hydroxy-N-N-dibenzyl aniline and 4-hydroxy-diphenyl amine, the organic substituents of said siloxane consisting essentially of monovalent hydrocarbon radicals attached to silicon through carbon-silicon linkages.

3. A composition of matter comprising a liquid polymeric organo-siloxane and a minor proportion of a hydroxy aromatic amine selected from the class consisting of p-amino-phenol, p-hydroxy-N-monobenzyl aniline, p-hydroxy-N-N-dibenzyl aniline and 4-hydroxy-diphenyl amine, said organo siloxane having on the average from approximately one to approximately two monovalent hydrocarbon radicals attached to each silicon atom through carbon-silicon linkages, at least some of said hydrocarbon radicals being alkyl radicals.

4. A composition of matter comprising a liquid organo-siloxane comprising essentially structural units of the formula $(CH_3)_2SiO$ and a minor proportion of a hydroxy aromatic amine selected from the class consisting of p-amino-phenol, p-hydroxy-N-monobenzyl aniline, p-hydroxy-N-N-dibenzyl aniline and 4-hydroxy-diphenyl amine.

5. A composition of matter comprising a liquid methyl siloxane comprising essentially structural units of the formula $(CH_3)_2SiO$ and a minor proportion of p-amino-phenol.

6. A composition of matter comprising a liquid methyl siloxane comprising essentially structural units of the formula $(CH_3)_2SiO$ and a minor proportion of p-hydroxy-N-monobenzyl aniline.

7. A composition of matter comprising a liquid methyl siloxane comprising essentially structural units of the formula $(CH_3)_2SiO$ and a minor proportion of 4-hydroxy-diphenyl amine.

ROB ROY McGREGOR.
EARL LEATHEN WARRICK.